(12) United States Patent
Kishi et al.

(10) Patent No.: US 8,055,839 B2
(45) Date of Patent: Nov. 8, 2011

(54) MAINTAINING RESERVED FREE SPACE AT THE END OF A PHYSICAL VOLUME FOR CREATING NEW SEGMENTS OF SEGMENTED LOGICAL VOLUMES IN THE RESERVED FREE SPACE

(75) Inventors: Gregory Tad Kishi, Oro Valley, AZ (US); Josephn M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 11/841,615

(22) Filed: Aug. 20, 2007

(65) Prior Publication Data

US 2009/0055616 A1   Feb. 26, 2009

(51) Int. Cl.
*G06F 12/00* (2006.01)
*G06F 13/00* (2006.01)
*G06F 13/28* (2006.01)

(52) U.S. Cl. ..................................... 711/111
(58) Field of Classification Search .................. 711/111
See application file for complete search history.

(56) References Cited

U.S. PATENT DOCUMENTS

| | | | |
|---|---|---|---|
| 5,502,811 A | 3/1996 | Ripberger | |
| 5,911,148 A | 6/1999 | Anglin | |
| 6,003,115 A | 12/1999 | Spear et al. | |
| 6,256,706 B1 | 7/2001 | Carlson et al. | |
| 6,453,383 B1 | 9/2002 | Stoddard et al. | |
| 6,532,548 B1 | 3/2003 | Hughes | |
| 6,597,883 B2 | 7/2003 | Muramatsu et al. | |
| 6,704,842 B1 | 3/2004 | Janakiraman et al. | |
| 6,816,957 B1 | 11/2004 | Halladay et al. | |
| 6,978,324 B1 | 12/2005 | Black | |
| 7,000,143 B2 | 2/2006 | Moulton et al. | |
| 2003/0028831 A1 | 2/2003 | Bickers et al. | |
| 2004/0034736 A1 | 2/2004 | Horn | |
| 2004/0044851 A1 | 3/2004 | Dawson et al. | |
| 2004/0044853 A1 | 3/2004 | Gibble et al. | |
| 2004/0044862 A1 | 3/2004 | Carlson et al. | |
| 2004/0205298 A1 | 10/2004 | Bearden et al. | |
| 2004/0250043 A1 | 12/2004 | Ripberger et al. | |
| 2005/0050263 A1 | 3/2005 | Ashton et al. | |
| 2006/0023357 A1 | 2/2006 | Deckers et al. | |
| 2006/0031656 A1 | 2/2006 | Carlson et al. | |

(Continued)

FOREIGN PATENT DOCUMENTS

EP   1202159 A   5/2002
WO   2005101182 A   10/2005

OTHER PUBLICATIONS

Article 19 amendment for PCT Application No. PCT/EP2008/060272 filed Aug. 5, 2008.

(Continued)

*Primary Examiner* — Kevin Ellis
*Assistant Examiner* — Chad L Davidson
(74) *Attorney, Agent, or Firm* — Rabindranath Dutta; Konrad Raynes & Victor LLP

(57) ABSTRACT

A storage manager application implemented in a first computational device maintains a virtual logical volume having a plurality of segments created by the storage manager application, wherein space is reserved at the end of a physical volume corresponding to the virtual logical volume, and wherein the physical volume comprises a linear storage medium. A request is received to write data, at the first computational device, from a second computational device. The data is written to the reserved space, wherein the writing of the data causes new segments to be created in the reserved space.

20 Claims, 6 Drawing Sheets

U.S. PATENT DOCUMENTS

2006/0136771 A1    6/2006  Watanabe
2006/0149898 A1    7/2006  Bello et al.
2008/0040540 A1*   2/2008  Cavallo ..................... 711/114

OTHER PUBLICATIONS

PCT International Search Report and Written Opinion dated Dec. 5, 2008 for Application No. PCT/EP2008/060272 filed Aug. 5, 2008.

US Patent Application entitled "Storing Redundant Segments and Parity Information for Segmented Logical Volumes", Serial No. unknown, Filing Date Aug. 20, 2007, by inventors G.T. Kishi.

US Patent Application entitled "Segmentation of Logical Volumes", Serial No. unknown, Filing Date Aug. 20, 2007, by inventors T.W. Bish, G.T. Kishi and J.W. Peake.

* cited by examiner

US 8,055,839 B2

MAINTAINING RESERVED FREE SPACE AT THE END OF A PHYSICAL VOLUME FOR CREATING NEW SEGMENTS OF SEGMENTED LOGICAL VOLUMES IN THE RESERVED FREE SPACE

BACKGROUND

1. Field

The disclosure relates to a method, system, and article of manufacture for the segmentation of logical volumes.

2. Background

In certain virtual tape storage systems, hard disk drive storage may be used to emulate tape drives and tape cartridges. For instance, host systems may perform input/output (I/O) operations with respect to a tape library by performing I/O operations with respect to a set of hard disk drives that emulate the tape library. In certain virtual tape storage systems at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a cache to volumes in the tape library. In VTS operations, the VTS processes the host's requests to access a volume in the tape library and returns data for such requests, if possible, from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache. However, since the capacity of the cache is relatively small when compared to the capacity of the tape library, not all volumes can be kept in the cache. Hence, the VTS may migrate volumes from the cache to the tape library, i.e., the VTS may transfer data from the cache to the tape cartridges in the tape library.

SUMMARY OF THE PREFERRED EMBODIMENTS

Provided are a method, system, and article of manufacture wherein a storage manager application implemented in a first computational device maintains a virtual logical volume having a plurality of segments created by the storage manager application, wherein space is reserved at the end of a physical volume corresponding to the virtual logical volume, and wherein the physical volume comprises a linear storage medium. A request is received to write data, at the first computational device, from a second computational device. The data is written to the reserved space, wherein the writing of the data causes new segments to be created in the reserved space.

In additional embodiments, an indicator associated with the storage manager application is maintained for managing the virtual storage volume and the linear storage medium. Based on the indicator it is determined how much space to reserve at the end of the physical volume for writing the data.

In further embodiments, the physical volume comprises a first tape. A determination is made that the reserved space is inadequate for the writing of the data. The physical volume is rebuilt with additional reserved space in response to determining that the reserved space is inadequate for the writing of the data. The rebuilt physical volume is stored on a second tape.

In yet further embodiments, the linear storage medium is a single tape, wherein the physical volume corresponding to the virtual logical volume is stored on the single tape. A determination is made that the reserved space is inadequate for the writing of the data. The physical volume is rebuilt with additional reserved space in response to determining that the reserved space is inadequate for the writing of the data. The rebuilt physical volume is stored on the single tape.

In additional embodiments, the first computational device is a virtual tape server and the second computational device is a host. A cache storage coupled to the virtual tape server is implemented in a disk device, and a secondary storage coupled to the virtual tape server is implemented in a tape device. The linear storage medium is a tape in the tape device, wherein all contents of the virtual logical volume fit on a single tape included in the tape device, and wherein all contents of the virtual logical volume do not fit at the same time on the cache storage.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Handling Logical Volumes a Single Entity

In certain VTS systems, logical volumes are handled as a single entity. However, when the size of physical volumes corresponding to a logical volumes becomes very large, such as in Linear Tape Open (LTO) drives, all data included in logical volumes may not be accommodated at the same time in the cache storage. Additionally, transfer operations of large logical volumes from the secondary storage to the cache storage may take a significantly greater amount of time in comparison to small logical volumes. The recall times for data may become excessively large in situations where logical volumes are handled as a single entity for transfer to the cache storage from the secondary storage in a VTS environment.

Exemplary Embodiments

Certain embodiments provide for the segmentation of virtual logical volumes in a VTS environment comprising a VTS that is coupled to a cache storage and a secondary storage, wherein the segmented virtual logical volumes are used to respond to data requests from a host. In certain embodiments, all contents of a segmented virtual logical volume may fit on a single tape included in the secondary storage, wherein all the contents of the segmented virtual logical volume may not fit at the same time in the cache storage. In certain embodiments, space is reserved at the end of a single tape corresponding to a segmented virtual logical volume. When data is updated in a segmented virtual logical volume by a host, the updated data may be written to the reserved space of the single tape, wherein the writing of the data causes new segments to be created in the reserved space of the single tape.

Figure 1:
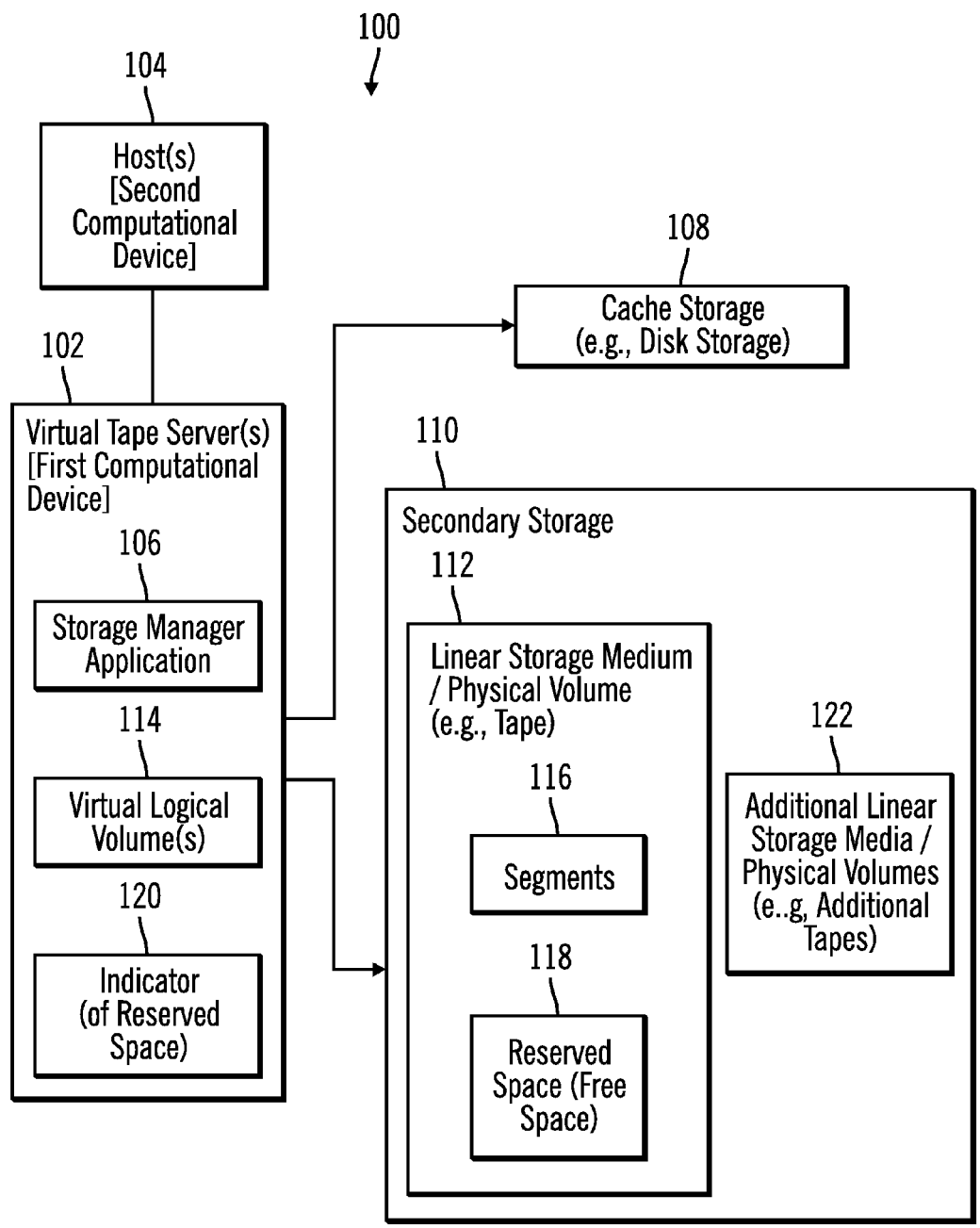
FIG. 1 illustrates a block diagram of a computing environment, in accordance with certain embodiments.

FIG. 1 illustrates a block diagram of a computing environment 100, in accordance with certain embodiments. The computing environment 100 includes a VTS 102. Additional VTSs can be deployed, but for purposes of illustration, a single VTS 102 is shown. In certain exemplary embodiments the VTS 102 may comprise a server computational device and may include any operating system known in the art. However, in alternative embodiments the VTS 102 may comprise any suitable computational device, such as a personal computer, a workstation, mainframe, a hand held computer, a palm top computer, a telephony device, network appliance, etc. The VTS 102 may be referred to as a first computational device 102.

The computing environment also includes a host 104 that is coupled to the VTS 102. Additional hosts may be deployed, but for purposes of illustration, a single host 104 is shown. The host 104 may be may coupled to the VTS 102 through a host data interface channel or any other direct connection or switching mechanism, known in the art (e.g., fibre channel, Storage Area Network (SAN) interconnections, etc.). The host 104 may be any suitable computational device known in the art, such as a personal computer, a workstation, a server, a mainframe, a hand held computer, a palm top computer, a telephony device, network appliance, etc.

The VTS 102 includes at least one application, such as a storage manager application 106 that manages storage. The storage manager application 106 may be implemented either as a standalone application or as a part of one or more other applications. The storage manager application 106 manages a cache storage 108, such as a disk based storage system, and a secondary storage 110 comprising a linear storage medium 112, such as a tape, wherein the cache storage 108 and the secondary storage 110 are coupled to the VTS 102 via a direct connection or via a network connection. The cache storage 108 improves performance by allowing host I/O requests from the hosts 104 to the secondary storage 110 to be serviced from the faster access cache storage 108 as opposed to the slower access secondary storage 110. The disks in the cache storage 108 may be arranged as a Direct Access Storage Device (DASD), Just a Bunch of Disks (JBOD), Redundant Array of Inexpensive Disks (RAID), etc.

The storage manager application 106 may perform or manage the data movement operations between the host 104, the cache storage 108, and the secondary storage 110. The storage manager application 106 generates virtual logical volumes 114, wherein virtual logical volumes 114 are logical representations of data stored in cache storage 108 and the secondary storage 110.

The storage manager application 106 maps the data stored in the cache storage 108 and secondary storage 110 to a plurality of virtual logical volumes 114. The hosts 104 perform I/O operations by using the virtual logical volumes 114 via the VTS 102. The storage manager application 106 maps the virtual logical volumes 114 to the linear storage medium 112 of the secondary storage 110. Thus, the virtual logical volumes 114 correspond to segments 116 stored in the linear storage medium 112 of the secondary storage 110.

In certain embodiments, the storage manager application 106 implemented in the VTS 102 (first computational device) maintains a virtual logical volume 114 having a plurality of segments created by the storage manager application 106, wherein space 118 is reserved at the end of a physical volume 112 corresponding to the virtual logical volume 114, and wherein the physical volume 112 comprises a linear storage medium. A request is received to write data on the virtual logical volume 114, at the VTS 102 (first computational device), from the host 104 (second computational device). The data is written to the reserved space 118 of the linear storage medium 112, wherein the writing of the data causes new segments to be created in the reserved space 118 of the linear storage medium 118.

In certain embodiments, an indicator 120 associated with the storage manager application 106 is maintained for managing the virtual storage volume 114 and the linear storage medium 112. Based on the indicator 120 it is determined how much space 118 to reserve at the end of the physical volume 112 for writing the data. For example, in certain embodiments a system administrator or a user may have set the indicator 120 to indicate the amount of space 118 to be reserved at the end of the physical volume 112. So some storage classes may have "X" amount of space reserved, whereas other storage classes may have "Y" amount of space reserved. For example "X" could be larger for an export storage class and "Y" could be smaller for a non-export storage class, and could even be zero. In certain embodiments the system administrator or the user may have set the indicator 120 such that no space 118 is reserved at the end of the physical volume 112.

In further embodiments, the secondary storage 110 may include additional linear storage media 122 (e.g., additional tapes) that are stored in addition to the linear storage medium 112. The additional storage media 122 may comprise physical volumes that correspond to one or more virtual logical volumes managed by the storage manager application 106 of the VTS 102.

Figure 2:
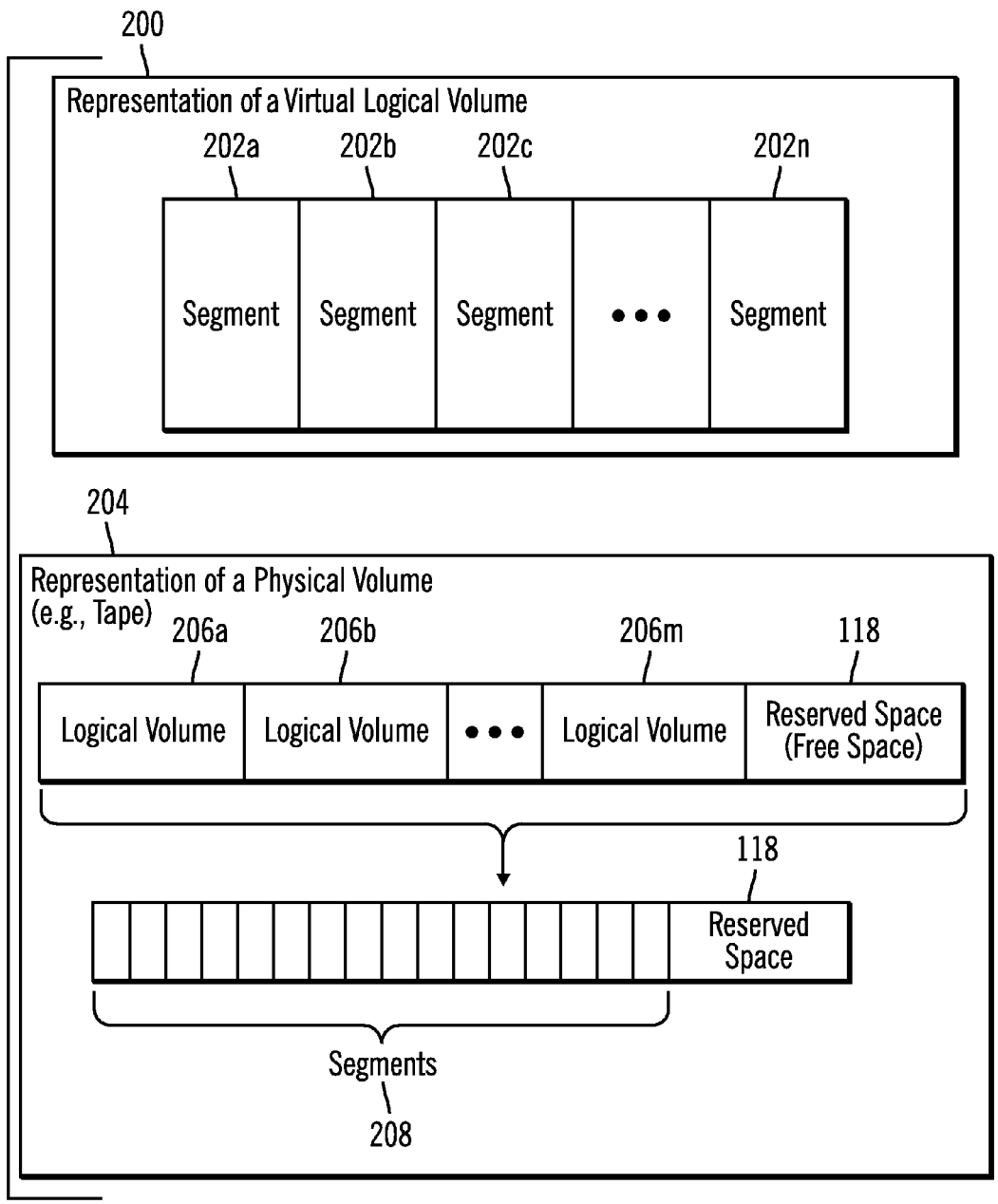
FIG. 2 illustrates a block diagram of representations of a virtual logical volume and a physical volume in accordance with certain embodiments.

FIG. 2 illustrates a block diagram of representations of a virtual logical volume and a physical volume (e.g., tape) in accordance with certain embodiments that may be implemented in the computing environment 100.

One representation 200 of a virtual logical volume 114 may comprise a plurality of segments 202a, 202b, 202c, . . . , 202n, wherein a segment is a unit of data storage. A greater or a fewer number of segments than shown in FIG. 2 may be implemented in certain embodiments.

In an exemplary representation 204 of the linear storage medium 112 (physical volume, e.g., tape) that is implemented in certain embodiments, the linear storage medium 112 stores a plurality of virtual logical volumes 206a, 206b, . . . , 206m and includes the reserved space 118. While FIG. 2 shows the virtual logical volumes 206a, 206b, . . . 206m stored in one sequence, the data stored in the virtual logical volumes 206a, 206b, . . . 206m may be stored in the segments 208 of the physical volume 204 in another sequence. For example, it is not necessary for all segments of a virtual logical volume to be stored consecutively without other intervening segments in segments 208 of the physical volume representation 204. In certain embodiments, the segments 208 shown in FIG. 2 may correspond to the segments 116 shown in FIG. 1.

Therefore, FIG. 2 illustrates certain exemplary representations of the virtual logical volumes 114 and the linear storage medium 112, in which segments of the virtual logical volumes 114 are stored in the linear storage medium 112 along with the reserved space 118.

Figure 3:
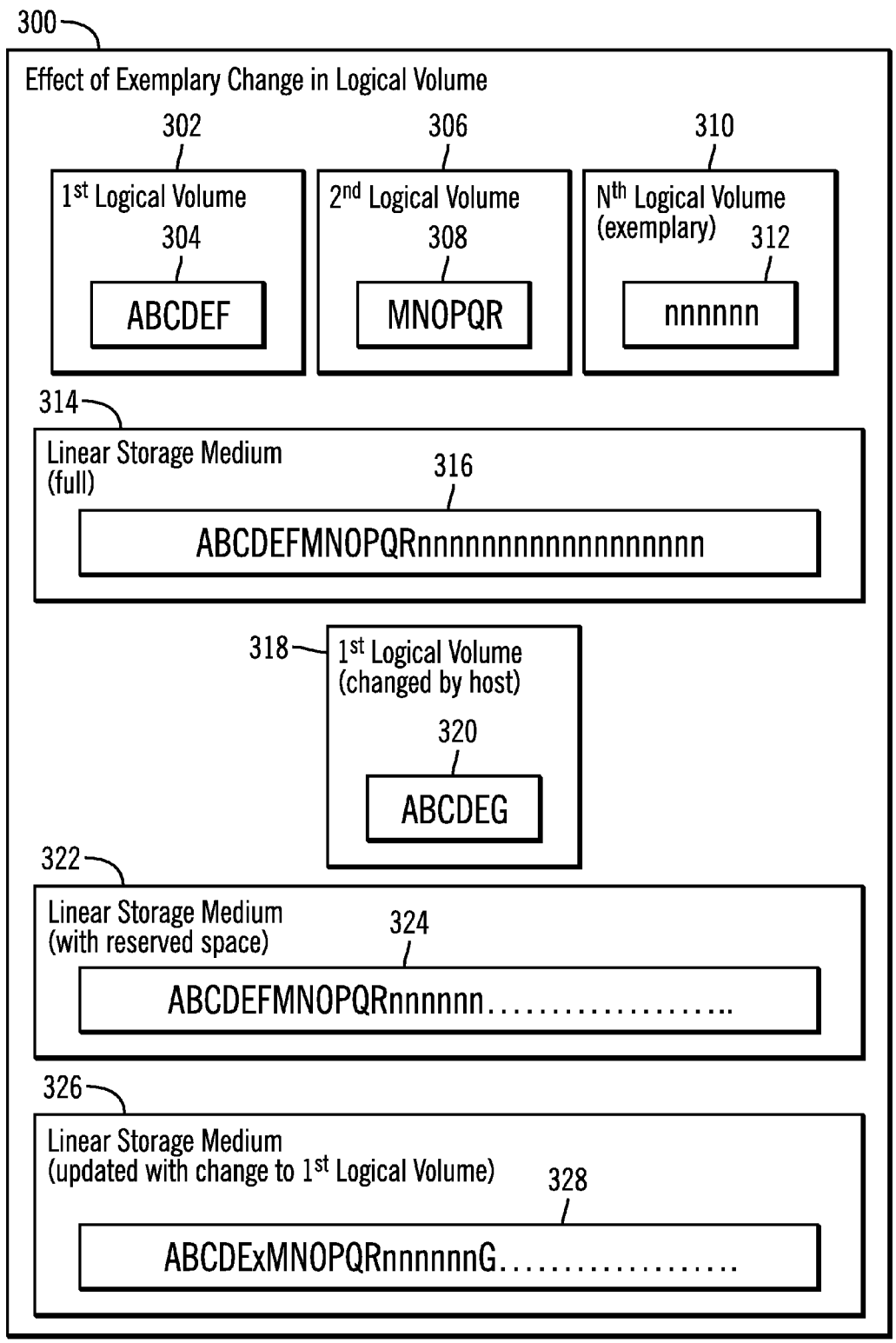
FIG. 3 illustrates a block diagram that shows the effect of an exemplary change in an exemplary logical volume in accordance with certain embodiments.

FIG. 3 illustrates a block diagram that shows the effect of an exemplary change 300 in an exemplary logical volume in accordance with certain embodiments.

In an exemplary embodiment, illustrated in FIG. 3, a $1^{st}$ logical volume 302 includes the segments A, B, C, D, E, F (represented by "ABCDEF" 304), a $2^{nd}$ logical volume 306 includes the M, N, O, P, Q, R (represented by "MNOPQR" 308), and an exemplary $N^{th}$ logical volume 310 includes segments 312, where the segments 312 are represented by as "nnnnnn" in FIG. 3. In certain exemplary embodiments, all the volumes 302, 306, 310 are in cache 108 (on the disk) and the are written to the linear storage medium 314 in order, wherein the linear storage medium 314 may be a tape stored in the secondary storage 110 of FIG. 1. If the indicator 120 of FIG. 1 indicates that no reserved space or not enough reserved space is to be kept in the linear storage medium 314, then in certain embodiments the linear storage medium 314 may be full when the segments "ABCDEFMNOPQRnnnnnnnnnnnnnnnnnn" 316 are stored in the linear storage medium 314. Subsequently, if the second computational device 104 (the host) recalls the $1^{st}$ logical volume 302 into the cache storage 108 and changes (for example by appending data) segment F, thereby making it G, then the changed $1^{st}$ logical volume 318 includes the segments "ABCDEG" 320. Since the linear storage medium 314 is full, there is no space to put segment G on the same linear storage medium 314 where segments "ABCDEF" 314 was stored. One way to keep the segments for the changed version of the $1^{st}$ logical volume 314 is to write the segments "ABCDEG" 320 to a new linear storage medium. It should be noted that in a linear storage medium, such as a tape, new segments not inserted in the middle of already stored segments but are appended at the end. In many situations, it may be desirable to keep all the segments of a logical volume together, primarily for "export" tapes that are removed from a system. As a result, it may be desirable in certain embodiments to reserve more space in a pool of tapes designated for export.

Therefore, in certain embodiment with an appropriate indication provided in the indicator 120, the linear storage medium 322 is written with the segments of the $1^{st}$ logical volume 302, the segments of the $2^{nd}$ logical volume 306, and other segments, followed by reserve space indicated via " . . . " in the linear storage medium 322. For example, the linear storage medium 322 is originally written with the segments "ABCDEFMNOPQRnnnnnn . . . " 324 where "." is reserved space that is empty. In such embodiments, the changed $1^{st}$ logical volume 318 can be accommodated in the linear storage medium 326 (which is the same as the linear storage medium 322 but has updated contents) with the segments "ABCDExMNOPQRnnnnnnG . . . " 328 where 'x' is expired data (i.e., the data of segment F has expired), and the new segment "G" has been put in the reserved space.

Therefore, FIG. 3 illustrates certain embodiments in which reserved space is kept in a linear storage medium to accommodate updated segments of virtual logical volumes, such that the time to write to a new linear storage medium is avoided in situations where the original linear storage medium would have been full in the absence of the reserved space.

Figure 4:
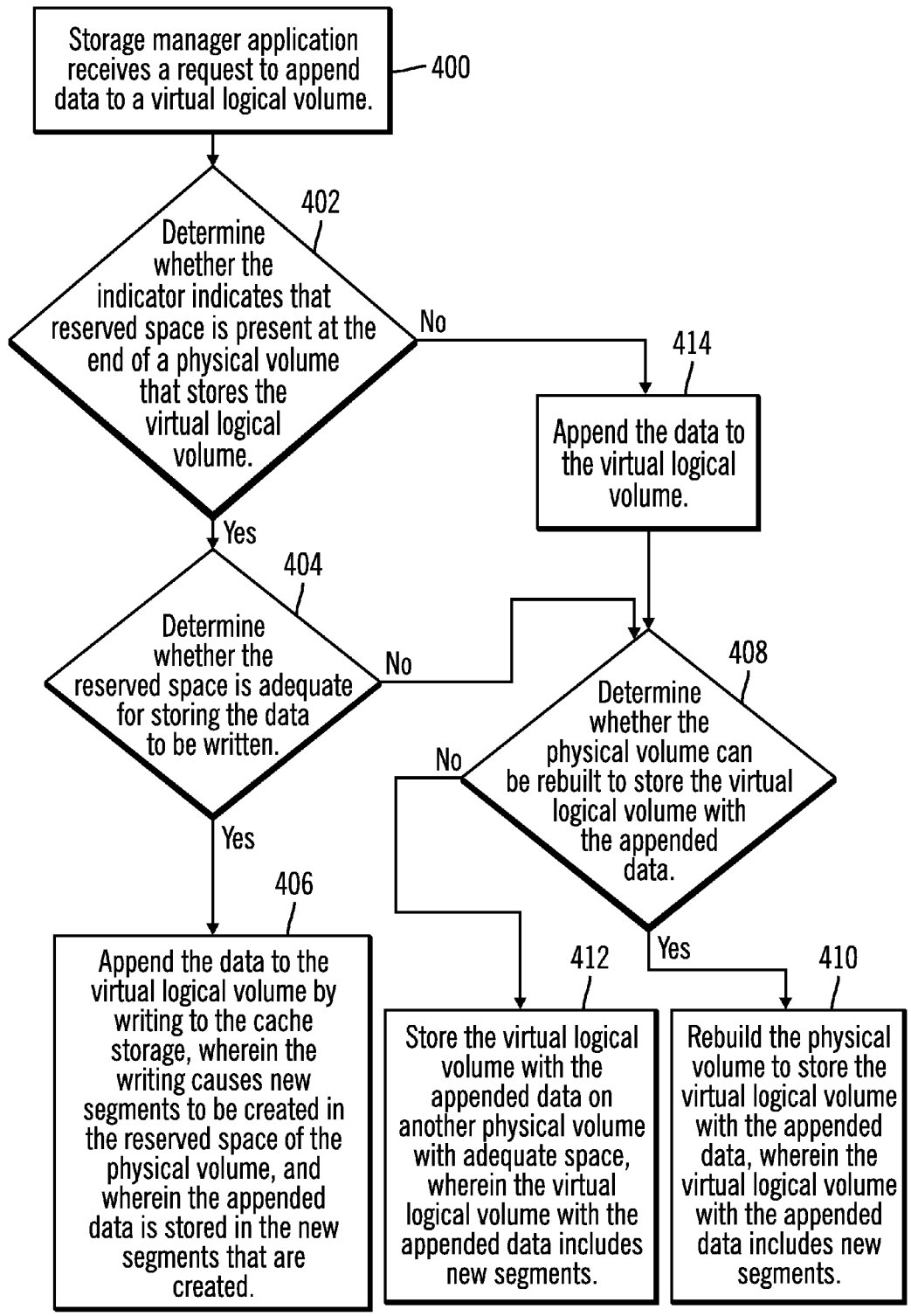
FIG. 4 illustrates first operations implemented in the computing environment, in accordance with certain embodiments.

FIG. 4 illustrates first operations implemented in the computing environment 100, in accordance with certain embodiments. The operations may be implemented by the storage manager application 106 included in the VTS 102.

Control starts at block 400, where the storage manager application 106 receives a request to append data to a virtual logical volume 114. The storage manager application 106 determines (at block 402) whether the indicator 120 stored in the virtual tape server 102 indicates that reserved space 118 is present at the end of a physical volume 112 that stores the virtual logical volume 114. If so, the storage manager application 106 determines (at block 404) whether the reserved space 118 is adequate for storing the data to be written. If the reserved space 118 is adequate for storing the data to be written, then the storage manager application appends (at block 406) the data to the virtual logical volume 114 by writing to the cache storage 108, wherein the writing causes new segments to be created in the reserved space 118 of the physical volume 112, and wherein the appended data is stored in the new segments that are created.

If at block 404, the storage manager application 106 determines that the reserved space 118 is not adequate for storing the data to be written, then the storage manager application 106 determines (at block 408) whether the physical volume 112 can be rebuilt to store the virtual logical volume 114 with the appended data. If so, then the storage manager application 106 rebuilds (at block 410) the physical volume 112 to store the virtual logical volume 114 with the appended data, wherein the virtual logical volume 114 with the appended data includes new segments. If not, then the storage manager application 106 stores (at block 412) the virtual logical volume 114 with the appended data on another physical volume 122 with adequate space, wherein the virtual logical volume 114 with the appended data includes new segments.

If at block 402, the indicator 120 indicates that reserved space is not present at the end of a physical volume 112 that stores the virtual logical volume 114, control proceeds to block 414 where the storage manager application 106 appends the data to the virtual logical volume, and control subsequently proceeds to block 408.

Therefore, FIG. 4 illustrates certain embodiments in which reserved space 118 is maintained at the end of a linear storage medium 112, such as a tape, wherein in response to a writing of data to a segmented virtual logical volume 114, additional segments that include the written data are stored in the reserved space 118. If the reserved space in not enough to write the data in the linear storage medium 112, then the linear storage medium 112, such as a tape, may have to be rebuilt or the data may have to be stored in an additional linear storage medium, both of which are more time consuming in comparison to writing the data to the reserved space 118.

Figure 5:
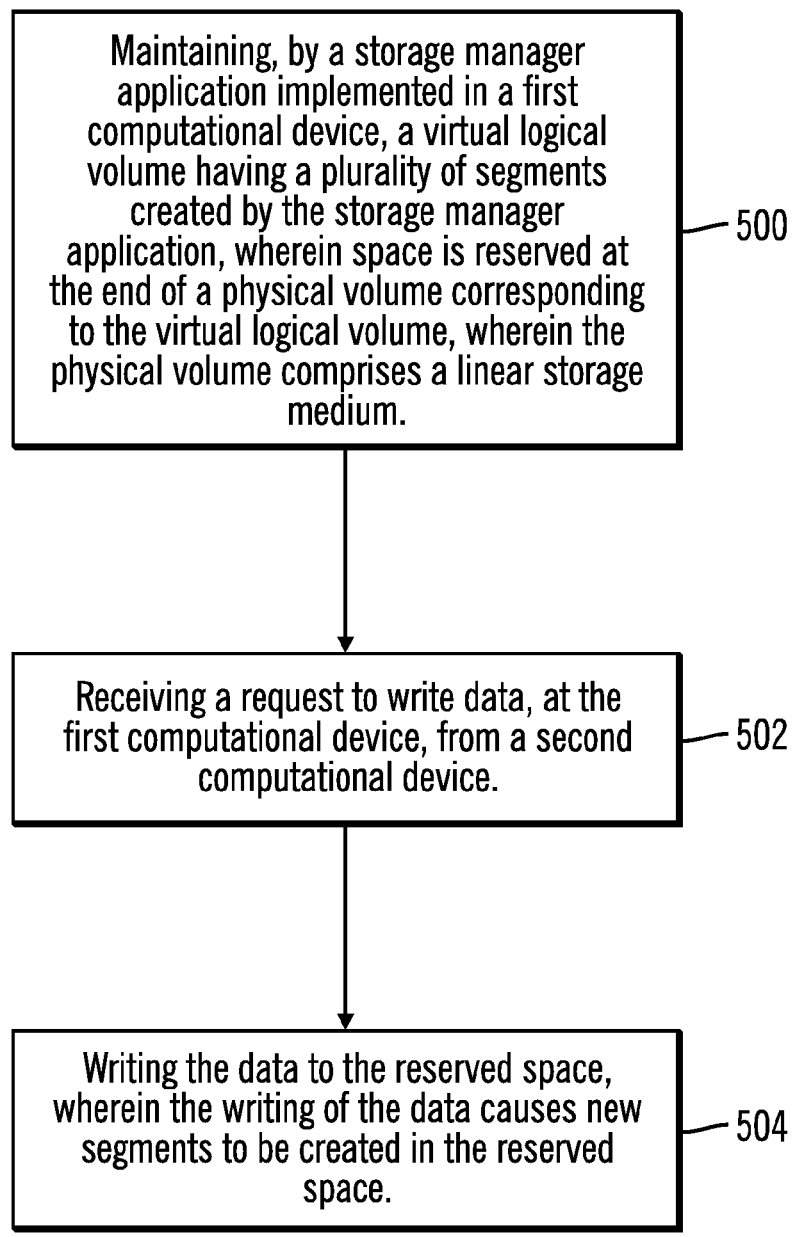
FIG. 5 illustrates second operations implemented in the computing environment, in accordance with certain embodiments.

FIG. 5 illustrates second operations implemented in the computing environment 100, in accordance with certain embodiments. The operations may be implemented by the storage manager application 106 included in the VTS 102.

Control starts at block 500, where a storage manager application 106 implemented in a first computational device 102 maintains a virtual logical volume 114 having a plurality of segments created by the storage manager application 106, wherein space 118 is reserved at the end of a physical volume 112 corresponding to the virtual logical volume 114, wherein the physical volume comprises a linear storage medium.

A request to write data is received (at block 502) at the first computational device 102, from a second computational device 104. The data is written (at block 504) to the e reserved space 118, wherein the writing of the data causes new segments to be created in the reserved space 118. In certain embodiments, the first computational device 102 is a virtual tape server and the second computational device 104 is a host. A cache storage 108 coupled to the virtual tape server 102 is implemented in a disk device, and a secondary storage 110 coupled to the virtual tape server 102 is implemented in a tape device. The linear storage medium 112 is a tape in the tape device, wherein all contents of the virtual logical volume 114 fit on a single tape included in the tape device, and wherein all contents of the virtual logical volume do not fit at the same time on the cache storage 108.

Therefore, FIG. 5 illustrates certain embodiments in which extra reserved space 118 is kept towards the end of a linear storage medium 110 to store updated data written to segmented virtual logical volumes 114.

Certain embodiments allow improved system performance in the usage of virtual logical volumes that are segmented. Space reservation allows enhanced performance when segments are appended. If a segmented logical volume (or any logical volume) is appended, the segmented logical volume needs larger space on a physical volume and the original version of the segmented logical volume on a physical tape is invalid. The entire logical volume may have be written to a different physical tape if no space is reserved for append changes at the end of each physical tape. If space is reserved for append changes at the end of each physical tape, then enhanced performance can be achieved.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
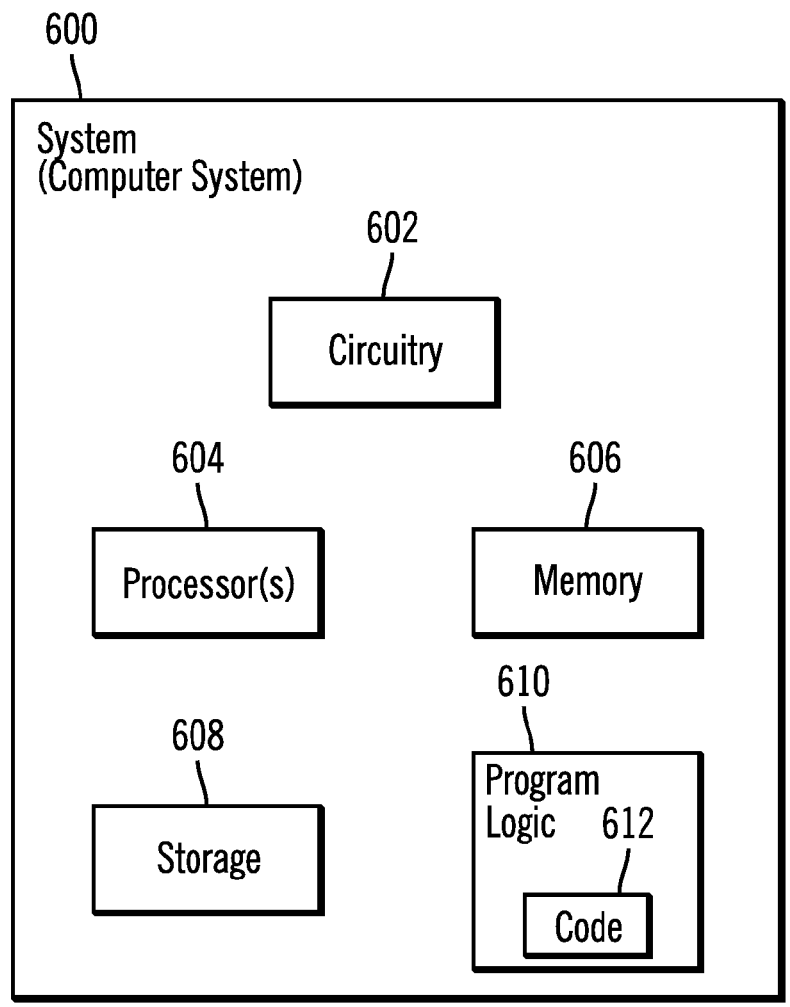
FIG. 6 illustrates a block diagram of a computer architecture in which certain described aspects of the embodiments are implemented.

FIG. 6 illustrates the architecture of computing system 600, wherein in certain embodiments the VTS 102 and the hosts 104 of the computing environments 100 of FIG. 1 may be implemented in accordance with the architecture of the computing system 600. The computing system 600 may also be referred to as a system, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   maintaining, in a first computational device, an indicator to indicate an amount of space to be reserved at the end of a physical volume of a secondary storage that is coupled to the first computational device;
   maintaining, by a storage manager application implemented in the first computational device, a virtual logical volume having a plurality of segments created by the storage manager application, wherein the plurality of segments are stored at the beginning of the physical volume corresponding to the virtual logical volume, wherein space is reserved at the end of the physical volume corresponding to the virtual logical volume based on the amount of space already indicated by the indicator, and wherein the physical volume is a linear storage medium;
   subsequent to space being reserved at the end of the physical volume, receiving a request to write data, at the first computational device, from a second computational device, wherein the data requested to be written is to update contents of a selected segment of the plurality of segments of the virtual logical volume; and
   in response to receiving the request to write data, writing the data to the reserved space to create a new segment in the reserved space that is different from the selected segment, wherein both the new segment and the selected segment are retained in the physical volume, and wherein the selected segment is indicated as being expired.

2. The method of claim 1, wherein the physical volume comprises a first tape, the method further comprising:
   determining that the reserved space is inadequate for the writing of the data;
   rebuilding the physical volume with additional reserved space in response to determining that the reserved space is inadequate for the writing of the data; and
   storing the rebuilt physical volume on a second tape.

3. The method of claim 1, wherein the linear storage medium is a single tape, wherein the physical volume corresponding to the virtual logical volume is stored on the single tape, the method further comprising:
   determining that the reserved space is inadequate for the writing of the data;
   rebuilding the physical volume with additional reserved space in response to determining that the reserved space is inadequate for the writing of the data;
   storing the rebuilt physical volume on the single tape.

4. The method of claim 1,
   wherein the first computational device is a virtual tape server;
   wherein the second computational device is a host;
   wherein a cache storage coupled to the virtual tape server is implemented in a disk device;
   wherein the secondary storage is coupled to the virtual tape server and is implemented in a tape device;
   wherein the linear storage medium is a tape in the tape device;
   wherein all contents of the virtual logical volume fit on a single tape included in the tape device; and
   wherein all contents of the virtual logical volume do not fit at the same time on the cache storage.

5. The method of claim 1, the method further comprising:
   reserving, via the indicator, a greater amount of space at the end of a first linear storage medium that is to be removed from a storage system, in comparison to an amount of space reserved at the end of a second linear storage medium that is not to be removed from the storage system.

6. A system, comprising:
   a memory ; and
   a processor coupled to the memory, wherein the processor performs operations, the operations comprising:
   maintaining, in a first computational device, an indicator to indicate an amount of space to be reserved at the end of a physical volume of a secondary storage that is coupled to the first computational device;
   maintaining, by a storage manager application implemented in the first computational device, a virtual logical volume having a plurality of segments created by the storage manager application, wherein the plurality of segments are stored at the beginning of the physical volume corresponding to the virtual logical volume, wherein space is reserved at the end of the physical volume corresponding to the virtual logical volume based on the amount of space already indicated by the indicator, and wherein the physical volume is a linear storage medium;

subsequent to space being reserved at the end of the physical volume, receiving a request to write data, at the first computational device, from a second computational device, wherein the data requested to be written is to update contents of a selected segment of the plurality of segments of the virtual logical volume; and in response to receiving the request to write data, writing the data to the reserved space to create a new segment in the reserved space that is different from the selected segment, wherein both the new segment and the selected segment are retained in the physical volume, and wherein the selected segment is indicated as being expired.

7. The system of claim 6, wherein the physical volume comprises a first tape, the operations further comprising:
determining that the reserved space is inadequate for the writing of the data;
rebuilding the physical volume with additional reserved space in response to determining that the reserved space is inadequate for the writing of the data; and
storing the rebuilt physical volume on a second tape.

8. The system of claim 6, wherein the linear storage medium is a single tape, wherein the physical volume corresponding to the virtual logical volume is stored on the single tape, the operations further comprising:
determining that the reserved space is inadequate for the writing of the data;
rebuilding the physical volume with additional reserved space in response to determining that the reserved space is inadequate for the writing of the data;
storing the rebuilt physical volume on the single tape.

9. The system of claim 6,
wherein the first computational device is a virtual tape server;
wherein the second computational device is a host;
wherein a cache storage coupled to the virtual tape server is implemented in a disk device;
wherein the secondary storage is coupled to the virtual tape server and is implemented in a tape device;
wherein the linear storage medium is a tape in the tape device;
wherein all contents of the virtual logical volume fit on a single tape included in the tape device; and
wherein all contents of the virtual logical volume do not fit at the same time on the cache storage.

10. The system of claim 6, the operations further comprising:
reserving, via the indicator, a greater amount of space at the end of a first linear storage medium that is to be removed from a storage system, in comparison to an amount of space reserved at the end of a second linear storage medium that is not to be removed from the storage system.

11. An article of manufacture including code, wherein the code when executed by a machine causes operations to be performed, the operations comprising:
maintaining, in a first computational device, an indicator to indicate an amount of space to be reserved at the end of a physical volume of a secondary storage that is coupled to the first computational device;
maintaining, by a storage manager application implemented in the first computational device, a virtual logical volume having a plurality of segments created by the storage manager application, wherein the plurality of segments are stored at the beginning of the physical volume corresponding to the virtual logical volume, wherein space is reserved at the end of the physical volume corresponding to the virtual logical volume based on the amount of space already indicated by the indicator, and wherein the physical volume is a linear storage medium;

subsequent to space being reserved at the end of the physical volume, receiving a request to write data, at the first computational device, from a second computational device, wherein the data requested to be written is to update contents of a selected segment of the plurality of segments of the virtual logical volume; and in response to receiving the request to write data, writing the data to the reserved space to create a new segment in the reserved space that is different from the selected segment, wherein both the new segment and the selected segment are retained in the physical volume, and wherein the selected segment is indicated as being expired.

12. The article of manufacture of claim 11, wherein the physical volume comprises a first tape, the operations further comprising:
determining that the reserved space is inadequate for the writing of the data;
rebuilding the physical volume with additional reserved space in response to determining that the reserved space is inadequate for the writing of the data; and
storing the rebuilt physical volume on a second tape.

13. The article of manufacture of claim 11, wherein the linear storage medium is a single tape, wherein the physical volume corresponding to the virtual logical volume is stored on the single tape, the operations further comprising:
determining that the reserved space is inadequate for the writing of the data;
rebuilding the physical volume with additional reserved space in response to determining that the reserved space is inadequate for the writing of the data;
storing the rebuilt physical volume on the single tape.

14. The article of manufacture of claim 11,
wherein the first computational device is a virtual tape server;
wherein the second computational device is a host;
wherein a cache storage coupled to the virtual tape server is implemented in a disk device;
wherein the secondary storage is coupled to the virtual tape server and is implemented in a tape device;
wherein the linear storage medium is a tape in the tape device;
wherein all contents of the virtual logical volume fit on a single tape included in the tape device; and
wherein all contents of the virtual logical volume do not fit at the same time on the cache storage.

15. The article of manufacture of claim 11, the operations further comprising:
reserving, via the indicator, a greater amount of space at the end of a first linear storage medium that is to be removed from a storage system, in comparison to an amount of space reserved at the end of a second linear storage medium that is not to be removed from the storage system.

16. A method for deploying computing infrastructure, comprising integrating computer-readable code into a computer, wherein the code in combination with the computer is capable of performing:
maintaining, in a first computational device comprising a processor coupled to a memory, an indicator to indicate an amount of space to be reserved at the end of a physical volume of a secondary storage that is coupled to the first computational device;

maintaining and storing, by a storage manager application implemented in the first computational device, a virtual logical volume having a plurality of segments created by the storage manager application, wherein the plurality of segments are stored at the beginning of the physical volume corresponding to the virtual logical volume, wherein space is reserved at the end of the physical volume corresponding to the virtual logical volume based on the amount of space already indicated by the indicator, and wherein the physical volume is a linear storage medium;

subsequent to space being reserved at the end of the physical volume, receiving a request to write data, at the first computational device, from a second computational device, wherein the data requested to be written is to update contents of a selected segment of the plurality of segments of the virtual logical volume; and in response to receiving the request to write data, writing the data to the reserved space to create a new segment in the reserved space that is different from the selected segment, wherein both the new segment and the selected segment are retained in the physical volume, and wherein the selected segment is indicated as being expired.

17. The method for deploying computing infrastructure of claim 16, wherein the physical volume comprises a first tape, wherein the code in combination with the computer is further capable of performing:

determining that the reserved space is inadequate for the writing of the data;

rebuilding the physical volume with additional reserved space in response to determining that the reserved space is inadequate for the writing of the data; and storing the rebuilt physical volume on a second tape.

18. The method for deploying computing infrastructure of claim 16, wherein the linear storage medium is a single tape, wherein the physical volume corresponding to the virtual logical volume is stored on the single tape, wherein the code in combination with the computer is further capable of performing:

determining that the reserved space is inadequate for the writing of the data;

rebuilding the physical volume with additional reserved space in response to determining that the reserved space is inadequate for the writing of the data;

storing the rebuilt physical volume on the single tape.

19. The method for deploying computing infrastructure of claim 16, wherein the first computational device is a virtual tape server;

wherein the second computational device is a host;

wherein a cache storage coupled to the virtual tape server is implemented in a disk device;

wherein the secondary storage is coupled to the virtual tape server and is implemented in a tape device;

wherein the linear storage medium is a tape in the tape device;

wherein all contents of the virtual logical volume fit on a single tape included in the tape device; and wherein all contents of the virtual logical volume do not fit at the same time on the cache storage.

20. The method for deploying computing infrastructure of claim 16, wherein the code in combination with the computer is further capable of performing:

reserving, via the indicator, a greater amount of space at the end of a first linear storage medium that is to be removed from a storage system, in comparison to an amount of space reserved at the end of a second linear storage medium that is not to be removed from the storage system.

* * * * *